July 29, 1924.

S. McGEE

TIRE CHAIN

Filed July 17, 1923

1,502,792

Inventor,
Spanish McGee,
By F. Hume Talbert,
Atty.

Patented July 29, 1924.

1,502,792

UNITED STATES PATENT OFFICE.

SPANISH McGEE, OF SHINNSTON, WEST VIRGINIA.

TIRE CHAIN.

Application filed July 17, 1923. Serial No. 652,075.

*To all whom it may concern:*

Be it known that SPANISH McGEE, a citizen of the United States of America, residing at Shinnston, in the county of Harrison and State of West Virginia, has invented new and useful Improvements in Tire Chains, of which the following is a specification.

The object of the invention is to provide a chain for application to the tires of motor vehicles and the like so as to provide a tread element which will positively preclude skidding both circumferentially and laterally.

To this end the invention consists in a certain construction and combination of parts of which a preferred embodiment is illustrated but which does not define the limits of the invention.

Figure 1:
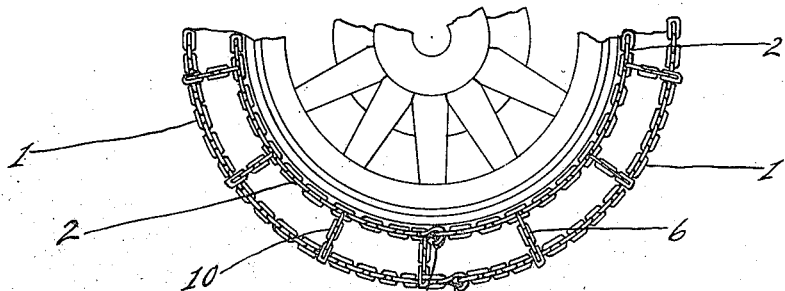
Figure 1 is an elevational view of a portion of the vehicle wheel showing the application of the invention thereto.
Figure 3:
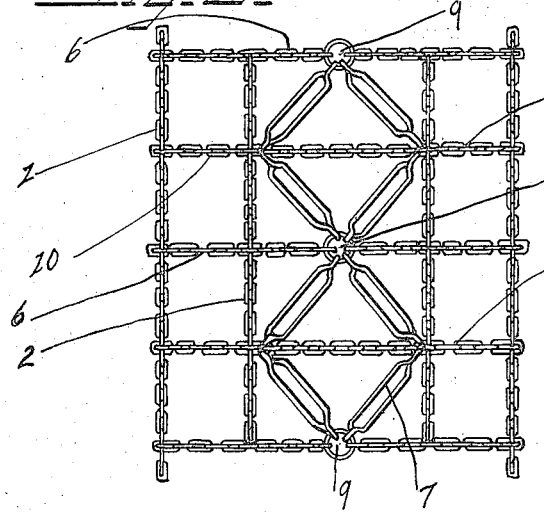
Figure 3 is an enlarged plan view of a section of the chain defining the tread elements, side chains and cross chains interconnected with the side chains and the tread elements.
Figure 2:
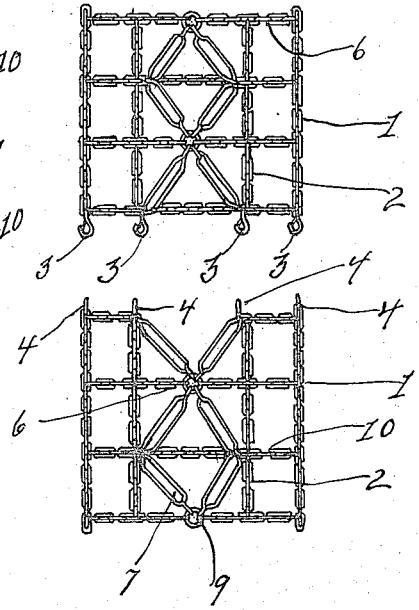
Figure 2 is a plan view of the chain dismounted from the vehicle.

The invention comprises the longitudinal or circumferential running chains 1 and the supplemental running chains 2, the latter being disposed adjacent to the active tread surface of the tire on opposite sides of the latter. Both the main and supplemental runners 1 and 2 are provided with terminal fasteners 3 for engagement with complemental fasteners 4 by which the runners may be secured around a tire such as that illustrated at 5 in Figure 1 of the drawings. Transverse or cross chains 6 interconnect the main and supplemental side chains or runners 1 and 2 and transversely span the tread of the tire at specified intervals therearound. The tread elements consist of flat links 7 formed with eyes 8 at their extremities and are arranged in diamond form as illustrated in Figure 2 of the drawings, a set of four links constituting one tread element and that being connected at opposite ends by eyes 9 with cross chains 6, and the next succeeding tread element being connected with the eye so that the tread elements are arranged in a circumferential series around the tread surface of the tire. Draw chains 10 are provided and connected with the side corners of the diamonds formed by the plurality of links and extend to the main side chains 1, being connected with the supplemental side chains 2 where they cross the latter. The draw chains serve to keep the links defining the two sides of the diamond in separated relation and the links are prevented from collapsing longitudinally of the diamond by their interconnection by the eyes 9. Notwithstanding there is enough relative movement between the links of each diamond shape tread member to permit sufficient shifting to enable the tread members to obtain the necessary tractive effect on the surface over which the device traverses.

Having described the invention, what is claimed as new and useful is:—

1. A tire chain comprising main side chains, transverse chains spanning the side chains, and diamond-shaped tread members consisting of separable links having eyes, and eyes engaging the eyes of the links defining adjacent corners of the tread members and engaged with the transverse chains, and spreader chains connecting the side corners of the tread members with the main side chains.

2. A tire chain comprising main side chains, transverse chains spanning the side chains, and diamond-shaped tread members consisting of separable links having eyes, and eyes engaging the eyes of the links defining adjacent corners of the tread members and engaged with the transverse chains, and spreader chains connecting the side corners of the tread members with the main side chains, said spreader chains being engaged with the eyes defining the side corners of the tread members.

In testimony whereof he affixes his signature.

SPANISH McGEE.